(12) United States Patent
Holmquist et al.

(10) Patent No.: US 8,931,322 B2
(45) Date of Patent: Jan. 13, 2015

(54) COIL HANDLING SYSTEM AND METHOD

(75) Inventors: Marlon E. Holmquist, Gibbon, MN (US); John E. Ihrke, Savage, MN (US); Daniel Peckskamp, Savage, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 1506 days.

(21) Appl. No.: 12/456,943

(22) Filed: Jun. 23, 2009

(65) Prior Publication Data

US 2010/0043514 A1 Feb. 25, 2010

Related U.S. Application Data

(60) Provisional application No. 61/133,170, filed on Jun. 25, 2008.

(51) Int. Cl.
*B21B 1/00* (2006.01)
*B23K 26/38* (2014.01)

(52) U.S. Cl.
CPC .............. *B23K 26/38* (2013.01); *B23K 2201/16* (2013.01)
USPC ..................... 72/203; 219/121.67; 219/121.72

(58) Field of Classification Search
USPC ......... 219/121.6, 121.7, 121.79, 384, 121.67, 219/121.72; 72/203
See application file for complete search history.

(56) References Cited

U.S. PATENT DOCUMENTS

| | | | | |
|---|---|---|---|---|
| 3,226,527 | A * | 12/1965 | Harding | 219/384 |
| 4,162,757 | A * | 7/1979 | Lemelson | 228/1.1 |
| 4,436,292 | A * | 3/1984 | Pfannschmidt | 266/107 |
| 4,551,810 | A | 11/1985 | Levine | |
| 4,782,208 | A * | 11/1988 | Withrow et al. | 219/121.72 |
| 5,250,784 | A * | 10/1993 | Muller et al. | 219/121.72 |
| 6,563,081 | B2 | 5/2003 | Pace | |
| 6,881,923 | B2 * | 4/2005 | Battaglia | 219/121.67 |
| 7,148,446 | B2 | 12/2006 | Harnisch et al. | |
| 2002/0189750 | A1 * | 12/2002 | Bleckmann et al. | 156/176 |
| 2003/0116543 | A1 * | 6/2003 | Battaglia | 219/121.67 |
| 2003/0168147 | A1 * | 9/2003 | Bleckmann | 156/64 |
| 2008/0190549 | A1 * | 8/2008 | Takagi et al. | 156/117 |

OTHER PUBLICATIONS

Eventures Automation; Centurio Sheetmetal Coil Handling and Cutting; 6 pgs, admitted prior art as of Jun. 25, 2008.
Sheetmetal Machinery; Hankwang Laser cutting Machines; 3 pgs; admitted prior art as of Jun. 25, 2008.

* cited by examiner

*Primary Examiner* — Henry Yuen
*Assistant Examiner* — Ayub Maye
(74) *Attorney, Agent, or Firm* — Merchant & Gould P.C.

(57) ABSTRACT

A material handling system for feeding sheet material to a laser cutting system. The material handling system including a shuttle having a number of roller pairs corresponding to a number of material coils. Each roller pair holding a leading end of one of the material coils. The shuttle translating the leading end of a selected material coil to a location at which sheet material from the selected material is fed to the laser cutting system.

22 Claims, 5 Drawing Sheets

COIL HANDLING SYSTEM AND METHOD

CROSS-REFERENCE TO RELATED APPLICATIONS

This application claims the benefit of U.S. Provisional Application Ser. No. 61/133,170, filed Jun. 25, 2008; which application is incorporated herein by reference.

FIELD OF THE INVENTION

The present disclosure relates generally to a system used in the manufacture of laser cut components, and various methods associated with such systems. More particularly, this disclosure relates to a material handling system, and various methods associated with material handling systems.

BACKGROUND OF THE INVENTION

Laser cutting machines are frequently utilized to manufacture low quantity or complex components from sheet material. In some laser-cutting arrangements, the sheet material is pre-cut to standard lengths that are fed onto a platform of a laser cutting machine. The pre-cut standard lengths of sheet material are often remotely stored in inventory.

In other laser-cutting arrangements, the sheet material is in coil form. In coil-fed systems, material is pulled from the coil, straightened, and fed onto the platform of a laser cutting machine in a continuous feed manner.

Changing sheet material between manufacturing jobs in either above system or arrangement, for example to utilize a different material type or thickness, is cumbersome and time consuming. Improvement of such arrangements and systems is desired.

SUMMARY OF THE INVENTION

The present disclosure relates to a laser cutting system having a shuttle arrangement that handles material coils utilized in the manufacture of laser cut components. The shuttle arrangement includes a shuttle having roller pairs that hold the leading coil ends of a number of material coils. In operation, the shuttle translates the leading coil end of a selected coil to a position at which the sheet material of the selected coil can be fed or dispense to the laser cutting system.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
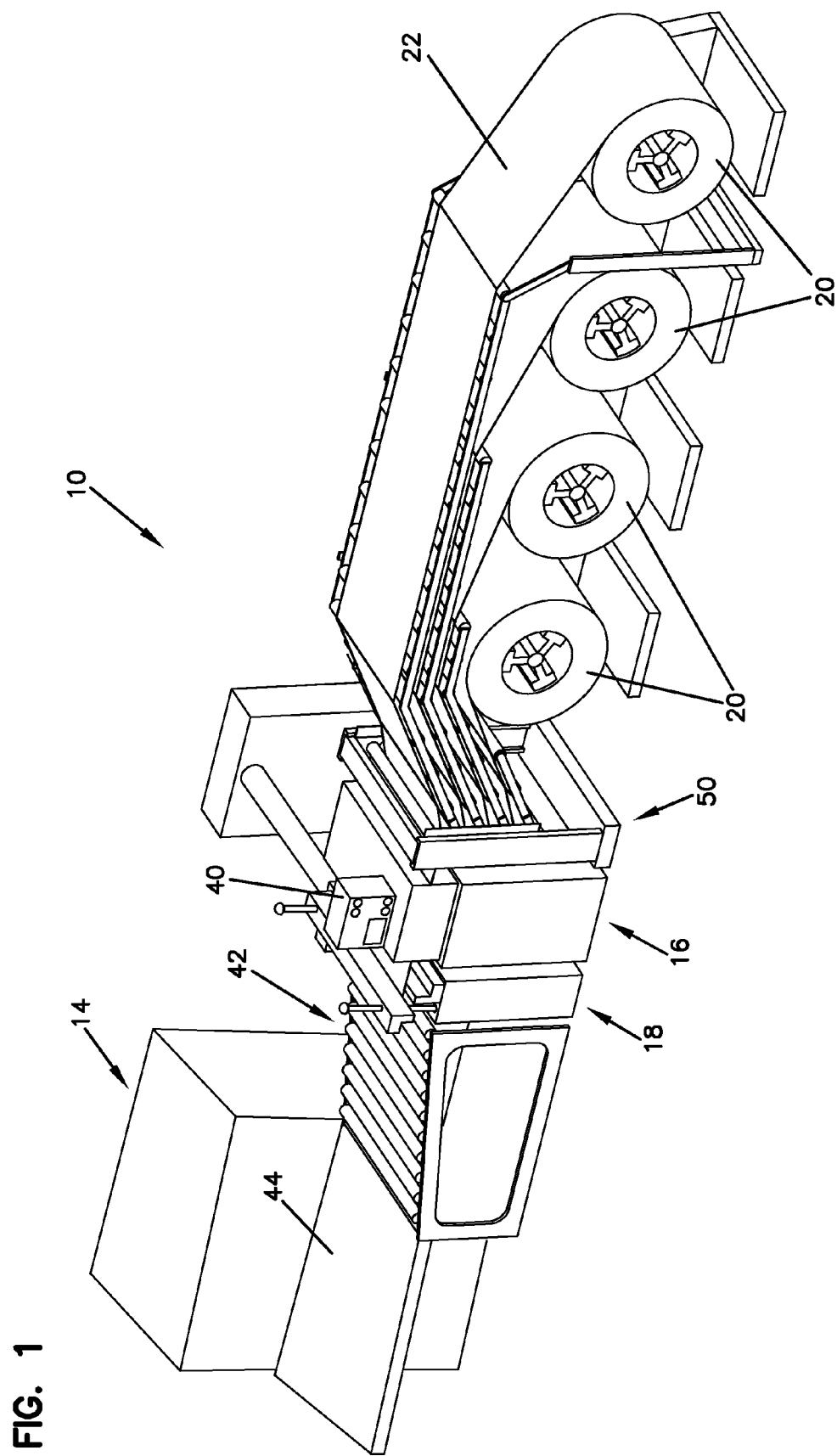
FIG. 1 is a schematic perspective view of one embodiment of a laser cutting system, including a shuttle system, in accordance with the principles disclosed.
Figure 2:
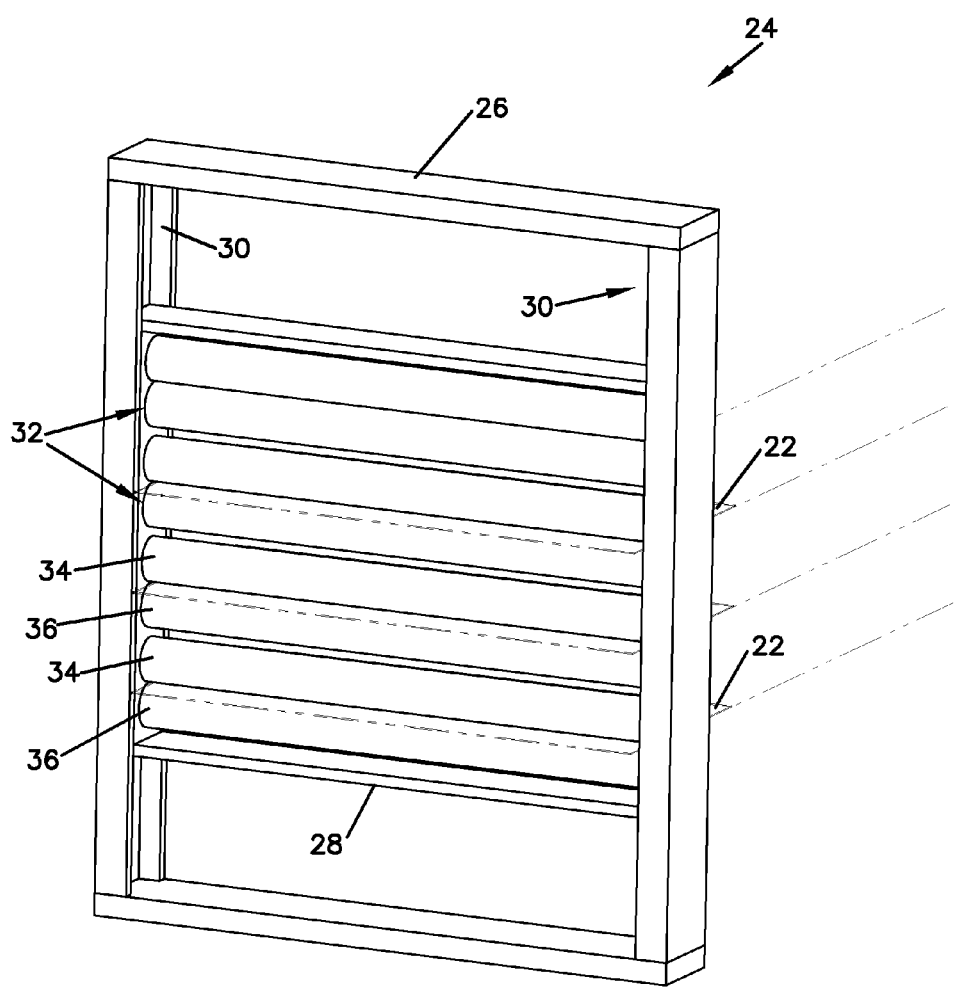
FIG. 2 is a front perspective view of a shuttle used in the laser cutting system of FIG. 1, shown in isolation.
Figure 3:
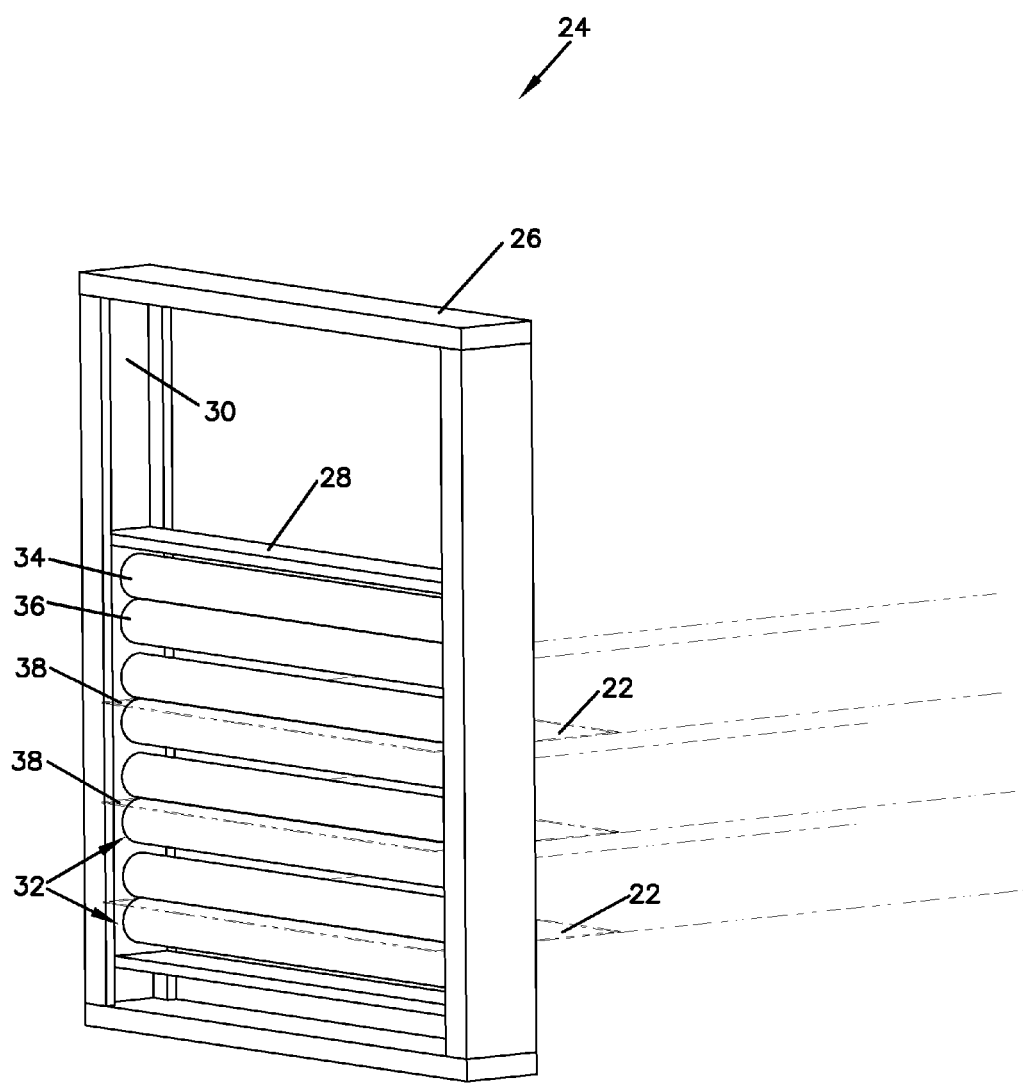
FIG. 3 is a side perspective view of the shuttle of FIG. 2, illustrated in a first indexed position.

FIG. 1 schematically illustrates one embodiment of a parts manufacturing system, such as a laser cutting system 10, in accordance with the principles disclosed. The laser cutting system 10 generally employs the use of a laser cutting machine 14, a straightening machine 16, and a shear 18, as will be described in greater detail hereinafter.

The present laser cutting system 10 further includes a material handling system or shuttle system 50 that functions in cooperation with a plurality of material coils 20. The shuttle system 50 allows for better material utilization (less material waste) and increases manufacturing efficiency rates by reducing material handling cost and time. During manufacture, each of the coils 20 is available to the laser cutting machine 14 of the system 10. The operator selects a particular material coil from the plurality of coils 20, and is permitted to switch between coils as needed, without retrieving material coils from a remote storage or inventory location. That is, any selected coil may be immediately fed into the system 10 for the production or manufacture of laser cut components. The particular coil or coils selected depend of course upon the requirements of the manufacturing task or job.

Referring still to FIG. 1, each coil of the plurality of material coils 20 is located a fixed coil location proximate to the laser cutting machine 14. What is meant by "located at a fixed coil location" is that each coil remains at one location until the coil is depleted or will no longer be used in the manufacture of parts; and is in contrast to a storage location from which the coil is retrieved and relocated for use in manufacturing parts. In other words, the fixed coil location is a location at which the coil is stored, and is also the location at which sheet material from the coil is uncoil and fed to the laser cutting system; no transportation of the coil is required for utilization of its sheet material in the manufacture of parts. Further, what is meant by "proximate" to the laser cutting machine is that the coil is located near or next to the laser cutting machine or laser cutting system such that sheet material can be uncoiled from the coil and fed directly into the system.

In use, the straightening machine 16 of the present laser cutting system 10 straightens sheet material 22 uncoiled from a selected coil of the plurality of material coils 20. The shuttle system 50 is used to feed the sheet material 22 of the selected coil into the straightening machine 16.

Referring to FIGS. 2-5, a shuttle 24 of the present shuttle system 50 is illustrated in isolation. The shuttle 24 includes a first fixed shuttle frame 26 and a second moving shuttle frame 28. The second moving shuttle frame 28 translates relative to the first fixed shuttle frame 26. In particular, the first frame 26 defines two tracks 30. The second frame 28 translates (e.g., slides or moves linearly) within the tracks 30 of the first frame 26.

Roller pairs 32, each including an upper roller 34 and a lower roller 36, are coupled to the second moving shuttle frame 28; the number of roller pairs 32 accordingly move along the tracks 30 of the first frame 26 with the second frame 28. In the illustrated embodiment, the roller pairs 32 are vertically aligned with one another; although in alternative embodiments, the pairs 32 may be offset from one another or staggered, yet still be stacked atop one another. The number of roller pairs 32 typically corresponds to the number of coils 20 of the system 10. In one embodiment, the shuttle system 50 includes four roller pairs 32 corresponding to four material coils 20; however, the number of roller pairs can be greater or lesser depending upon the number of materials coils.

Figure 5:
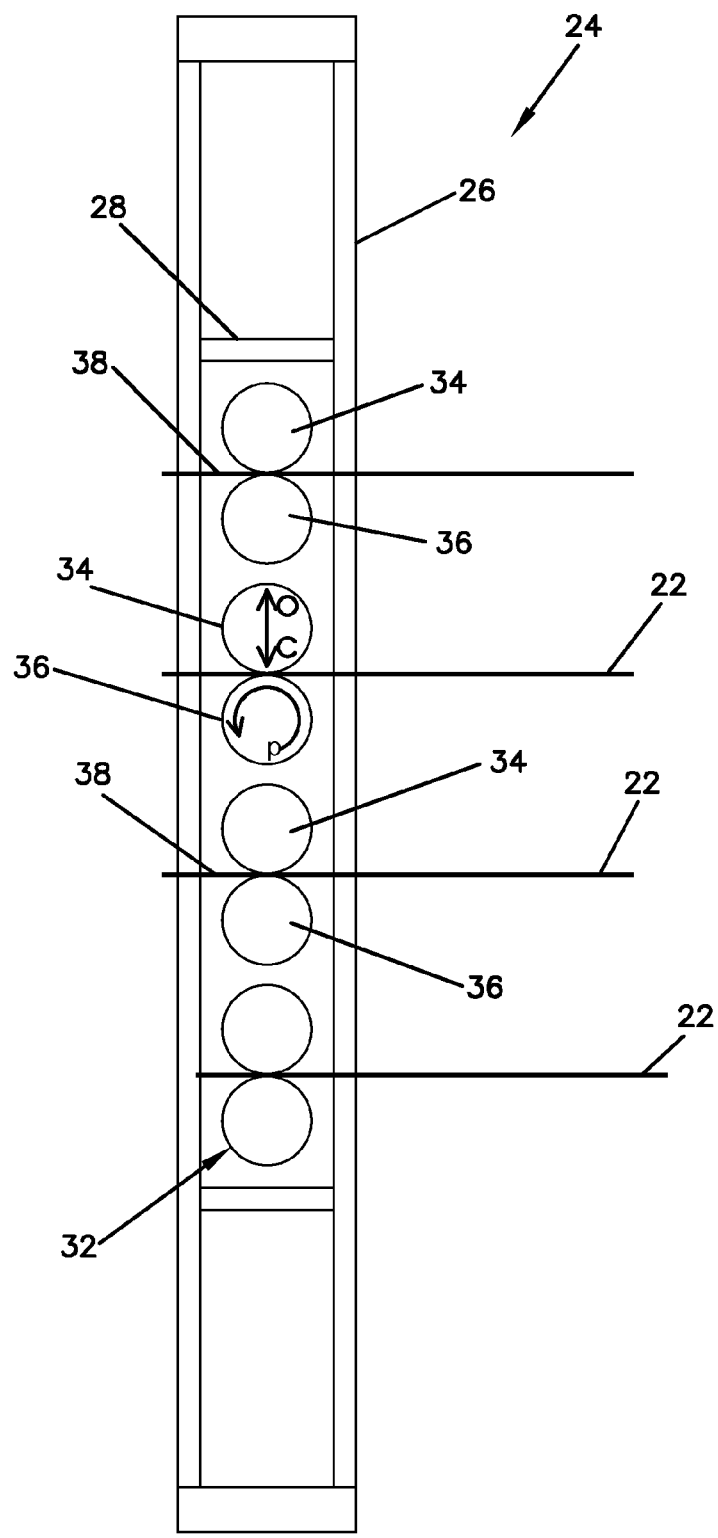
FIG. 5 is a side elevation view of the shuttle of FIG. 4.

Referring to FIG. 5, each roller pair 32 is configured to receive a leading end 38 of the continuous sheet material 22 of a material coil. In the illustrated embodiment, at least one of the rollers, e.g., the upper roller 34, opens (O) or moves in relation to the other roller (e.g., 36) to receive the leading end 38 of the sheet material 22. When the leading end 38 of sheet material 22 is placed or inserted between the rollers 34, 36, the opened roller 34 closes (C) or clamps down on the sheet material 22 to securely hold the material between the rollers. The one roller 34 is preferably configured to open and close/clamp to receive and hold materials of different thicknesses.

Further, at least one of the rollers, e.g., the lower roller 36, is powered (P) to drive the sheet material 22 through the roller pair 32. In the illustrated shuttle system 50, a controller 40 (FIG. 1) is used to control the translating movement of the roller pairs 32 along the tracks 30 of the fixed frame 26 (i.e., the translating movement of the second frame 28), and also to control the rotational drive of the lower roller 36 of each roller pair 32.

Figure 4:
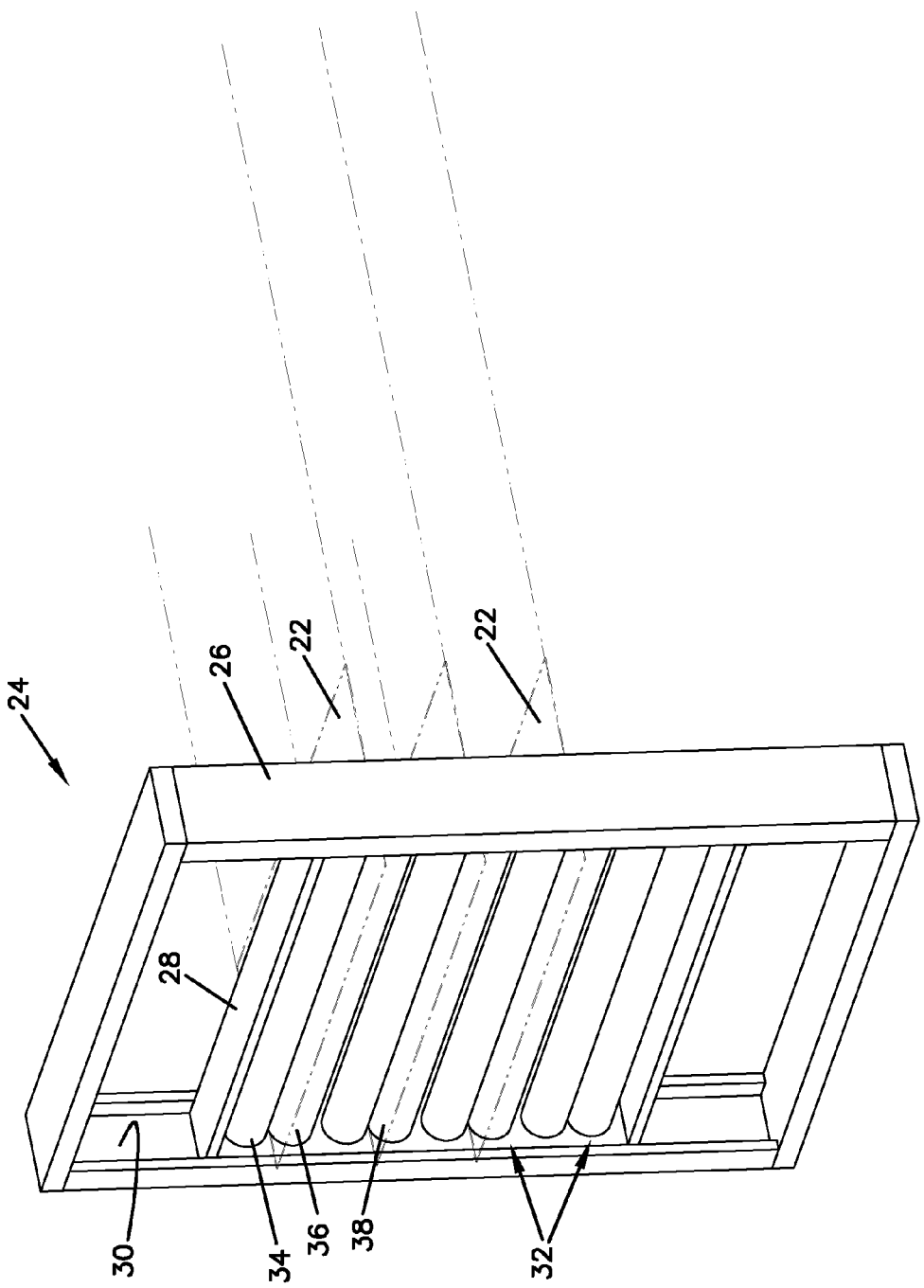
FIG. 4 is a side perspective view of the shuttle of FIG. 2, illustrated in a second indexed position.

In operation, an operator selects which coil of material 20 will be used in the manufacture of components. The selection can be entered into the controller 40, or signaled by energizing a corresponding switch or other electrical control device. Upon selecting the particular material coil 20, the shuttle 24 vertically translates the roller pairs 32 upward or downward to align the leading end 38 of the selected material coil 20 with the straightening machine 16. For example, in FIG. 3, the roller pairs 32 are shown in a first position where a first roller pair is aligned at a height for feeding the straightening machine 16. In FIG. 4, the roller pairs 32 are shown in a second position where a second roller pair is aligned at the height for feeding the straightening machine 16. In the illustrated embodiment, the roller pairs 32 vertically translate in unison along the tracks 30 of the fixed shuttle frame 26.

When the leading end 38 of the sheet material 22 is aligned with the straightening machine 16, the power-driven roller (e.g., 36) is activated to uncoil material from the selected coil and feed the sheet material into the straightening machine 16. The straightening machine straightens the uncoiled sheet material 22.

Referring back to FIG. 1, the shear 18 of the laser cutting system 10 cuts the straightened material to a desired length. The controller 40 can be used to also control the length at which the sheet material is cut. That is, the operator can set a length parameter at which the roller pairs dispense the sheet material and stop the feed so that the shear 18 can cut the sheet material; thereby producing a customized cut length of straightened sheet material. A conveyor 42 may be used to convey the cut length of straightened material onto a laser-cutting platform 44 where the laser cutting machine 14 cuts the components.

The above feature of the present method of manufacture reduces materials costs in comparison to methods utilizing standardized lengths of sheet stock. For example, with the present system, the operator is permitted to customize the cut length of the sheet material that is coil-fed to the laser cutting machine, as opposed to using conventional standardized lengths of sheet stock. This results in better material utilization and less material waste. Also, material costs are reduced by eliminating several material handling steps associated with the use of conventional standardized lengths of sheet stock, for example, pre-cutting, stacking, and packaging the standardized lengths.

As described, each coil 20 of the plurality of coils uncoils at the respective fixed coil location when fed into the straightening machine 16. This arrangement eliminates the step of retrieving a coil from storage or moving a coil in line or to a work area for use in the making of components. In fact, successive manufacturing jobs are quickly and easily run by simply selecting a different coil needed for a subsequent job. When the different coil is selected, the shuttle 24 translates the leading end 38 of that particular different coil upward or downward to align the end 38 with the straightening machine 16, then feeds that different material into the system. The manufacture of different components can continue without having to change out sheet materials. The plurality of coils 20 of the present system 10 can accordingly include a number of coils having different material types and/or thicknesses to accommodate different manufacturing jobs. As previously described, the illustrated system includes four material coils that can be of different materials and/or thicknesses, although a greater or lesser number of material coils can be provided.

In addition to saving manufacturing costs by reducing waste material, the present laser cutting system 10 further save costs by reducing machine set up time; which can significantly reduce manufacturing cost associated with high mix, low volume manufacturing jobs. In particular, each of the material coils is readily available for feeding the laser cutting system; to begin the production cycle of a manufacturing job, the operator need only select the coil and activate the feeding process. Conventional methods required the operator to count and pull stock sheets from inventory and transport the stock sheets to the laser machine. In the alternative, in conventional continuous single coil feed system, the operator is required to change out coils when ever a subsequent job utilizes a different type or different thickness of sheet material. This again requires the operator to pull a replacement coil from inventory, transport the coil to the laser machine, and return the removed coil to storage. As can be understood, the immediate availability of a number of different material coils significantly and favorably impacts the manufacturing of laser-cut components in a variety of ways.

While the shuttle system 50 disclosed herein is illustrated and described with respect to the laser-cutting machine 14, the shuttle system 50 can further be utilized to feed coiled material (including coiled sheet metal or coiled plastic) into a turret press, metal stamping machine, or other sheet material cutting, processing or parts-forming machine.

The above specification provides a complete description of the present invention. Since many embodiments of the invention can be made without departing from the spirit and scope of the invention, certain aspects of the invention reside in the claims hereinafter appended.

What is claimed is:

1. A laser cutting system, comprising:
   a) a laser cutting machine that utilizes sheet material to manufacture laser cut components;
   b) a plurality of material coils, each coil being located at a fixed coil location proximate to the laser cutting machine;
   c) a straightening machine that straightens material uncoiled from a selected coil of the plurality of material coils; and
   d) a shuttle including a first fixed shuttle frame, a second moving shuttle frame that translates relative to the first fixed shuttle frame, and roller pairs that feed sheet material from any selected coil into the straightening machine;
   e) wherein each coil of the plurality of material coils uncoils at the respective fixed coil location when fed into the straightening machine, wherein a leading end of each material coil is held by one of the roller pairs of the shuttle.

2. The laser cutting system of claim 1, further including a shear that cuts the material straightened by the straightening machine to a selected length.

3. The laser cutting system of claim 1, wherein the plurality of material coils includes at least one coil having a different material than that of the other coils.

4. The laser cutting system of claim 1, wherein the plurality of material coils include at least one coil having a different material thickness than that of the other coils.

5. The laser cutting system of claim 1, wherein the plurality of material coils includes at least four material coils.

6. The laser cutting system of claim 1, wherein the shuttle vertically translates the roller pairs to align the leading end of a selected material coil with the straightening machine.

7. The laser cutting system of claim 1, wherein each of the roller pairs is vertically aligned with one another.

8. The laser cutting system of claim 1, wherein the corresponding roller pair of a selected coil is actuated to feed the sheet material into the straightening machine.

9. The laser cutting system of claim 2, further including a conveyor that conveys the cut length of straightened material onto a laser-cutting platform of the laser cutting machine.

10. A shuttle system for use with a parts manufacturing system, the shuttle system comprising:
   a) a first fixed shuttle frame that defines a track;
   b) a second moving shuttle frame that translates relative to the first fixed shuttle frame, the second moving shuttle frame including a plurality of vertically aligned roller pairs moveable along the track of the first fixed shuttle frame, each roller pair being configured to receive a leading end of one of a plurality of coils of sheet material; and
   c) a controller that controls the movement of the plurality of aligned roller pairs along the track of the first fixed shuttle frame, the controller further controlling rotational movement of at least one roller of each roller pair.

11. The shuttle system of claim 10, wherein at least one roller of each roller pair moves in relation to the other roller of the roller pair to receive sheet material having different material thicknesses.

12. The shuttle system of claim 10, wherein the plurality of vertically aligned roller pairs includes at least four roller pairs.

13. The shuttle system of claim 10, wherein the controller vertically translates the roller pairs in unison along the track of the first fixed shuttle frame.

14. The shuttle system of claim 10, wherein the at least one roller drives the sheet material through the roller pair when signaled by the controller.

15. A parts manufacturing system, comprising:
   a) a parts-forming machine that utilizes sheet material to manufacture components;
   b) a plurality of material coils, each coil being located at a fixed coil location proximate to the parts-forming machine;
   c) a straightening machine that straightens material uncoiled from a selected coil of the plurality of material coils; and
   d) a shuttle including a first fixed shuttle frame, a second moving shuttle frame that translates relative to the first fixed shuttle frame, and roller pairs that feed sheet material from any selected coil into the straightening machine;
   e) wherein each coil of the plurality of material coils uncoils at the respective fixed coil location when fed into the straightening machine, wherein a leading end of each material coil is held by one of the roller pairs of the shuttle.

16. The parts manufacturing system of claim 15, further including a shear that cuts the material straightened by the straightening machine to a selected length.

17. The parts manufacturing system of claim 15, wherein the plurality of material coils includes at least one coil having a different material than that of the other coils.

18. The parts manufacturing system of claim 15, wherein the plurality of material coils include at least one coil having a different material thickness than that of the other coils.

19. The parts manufacturing system of claim 15, wherein the shuttle vertically translates the roller pairs to align the leading end of a selected material coil with the straightening machine.

20. The parts manufacturing system of claim 15, wherein each of the roller pairs is vertically aligned with one another.

21. The parts manufacturing system of claim 15, wherein the corresponding roller pair of a selected coil is actuated to feed the sheet material into the straightening machine.

22. The parts manufacturing system of claim 15, wherein the parts-forming machine is a laser cutting machine.

* * * * *